US010769442B1

(12) United States Patent
Ding et al.

(10) Patent No.: US 10,769,442 B1
(45) Date of Patent: Sep. 8, 2020

(54) SCENE CHANGE DETECTION IN IMAGE DATA

(71) Applicant: Amazon Technologies, Inc., Seattle, WA (US)

(72) Inventors: Siyi Ding, Santa Clara, CA (US); Xiaoran Wang, Mountain View, CA (US); Manika Puri, Santa Clara, CA (US); Mashhour Solh, San Jose, CA (US); Philip James Taylor, Cambridge (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 124 days.

(21) Appl. No.: 15/700,536

(22) Filed: Sep. 11, 2017

(51) Int. Cl.
G06K 9/00 (2006.01)
G06K 9/62 (2006.01)
G06T 7/246 (2017.01)

(52) U.S. Cl.
CPC ..... *G06K 9/00718* (2013.01); *G06K 9/00744* (2013.01); *G06K 9/00771* (2013.01); *G06K 9/6212* (2013.01); *G06K 9/6215* (2013.01); *G06T 7/248* (2017.01); *G06T 2207/10016* (2013.01)

(58) Field of Classification Search
CPC .................................................. G06K 9/00771
See application file for complete search history.

(56) References Cited

U.S. PATENT DOCUMENTS

| | | | | |
|---|---|---|---|---|
| 7,899,208 | B2* | 3/2011 | Kondo | G06K 9/32 348/135 |
| 2008/0291288 | A1* | 11/2008 | Tzur | H04N 5/23248 348/222.1 |
| 2010/0149424 | A1* | 6/2010 | Yoon | H04N 5/147 348/700 |
| 2011/0080525 | A1* | 4/2011 | Bock | H04N 19/53 348/699 |
| 2011/0293176 | A1* | 12/2011 | Abe | H04N 19/14 382/165 |
| 2014/0093164 | A1* | 4/2014 | Noorkami | G06K 9/00744 382/165 |
| 2017/0076571 | A1* | 3/2017 | Borel | G08B 13/19669 |
| 2018/0063436 | A1* | 3/2018 | Miyazawa | H04N 5/23254 |

* cited by examiner

*Primary Examiner* — Nay A Maung
*Assistant Examiner* — Jose M Torres
(74) *Attorney, Agent, or Firm* — K&L Gates LLP

(57) ABSTRACT

Techniques are generally described for scene change detection. A first and second histogram representing frames of a video may be received. A Euclidean distance between the first and second histogram may be determined. A third histogram of a third frame may be received. Values of the third histogram may be compared to corresponding values of a background model of the environment. A fourth frame and a fifth frame of image data of the video may be received. A flow value between a first block of pixels of the fourth frame and a corresponding second block of pixels of the fifth frame may be determined. The flow value may be determined based on a motion vector and a sum of absolute differences between the first and second block. A portion of the video may be streamed to a remote computing device if the flow value exceeds a threshold value.

20 Claims, 9 Drawing Sheets

SCENE CHANGE DETECTION IN IMAGE DATA

BACKGROUND

Cameras and other image sensors may be used to capture images and/or videos of a physical environment, sometimes for surveillance or monitoring certain areas of interest. Some cameras include image sensors effective to detect light in both the visible and infrared (IR) spectrums, which enable the operation of those cameras in day and night modes. Image data generated by cameras may be processed to determine characteristics of the area of interest being recorded, such as for detecting motion or movement in the recorded areas.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for detecting significant changes between two or more frames of video data, such as for detecting scene changes and/or motion detection. Various embodiments may enable scene change detection and/or motion detection for only changes of a certain magnitude, thereby reducing notifications, alerts, or other communications produced when changes of insignificant magnitude occur. In some embodiments in which the image data corresponding to such scene changes or motion is transmitted over a network for processing by remote servers, this reduction in communications can enable a reduction in network bandwidth consumption and remote processing resources.

Image data, as described herein, may refer to stand-alone frames of image data or to multiple frames of sequential image data, appended together to form a video. Frames of image data may be comprised of a plurality of pixels arranged in a two-dimensional grid including an x component representing a horizontal direction in the grid and a y component representing a vertical direction in the grid. A pixel is an addressable unit of image data in a frame. A particular pixel may be identified by an x value, representing the horizontal position of the pixel in the two-dimensional grid and a y value, representing the vertical position of the pixel in the two-dimensional grid. Additionally, blocks, as described herein, may refer to blocks of pixels. For example, a frame of image data may be conceptually separated into a number of rectangular blocks of pixels (sometimes referred to as "macroblocks"). In various examples, blocks may comprise 8 rows and 8 columns of pixels (e.g., 8×8). In some other examples, blocks may comprise 16 rows and 16 columns of pixels (e.g., 16×16). In addition to the foregoing examples, blocks may have different dimensions apart from those specifically listed herein. A scene, as referred to herein, may refer to a portion of a physical environment represented that may be represented in the image data of a frame.

Figure 1:
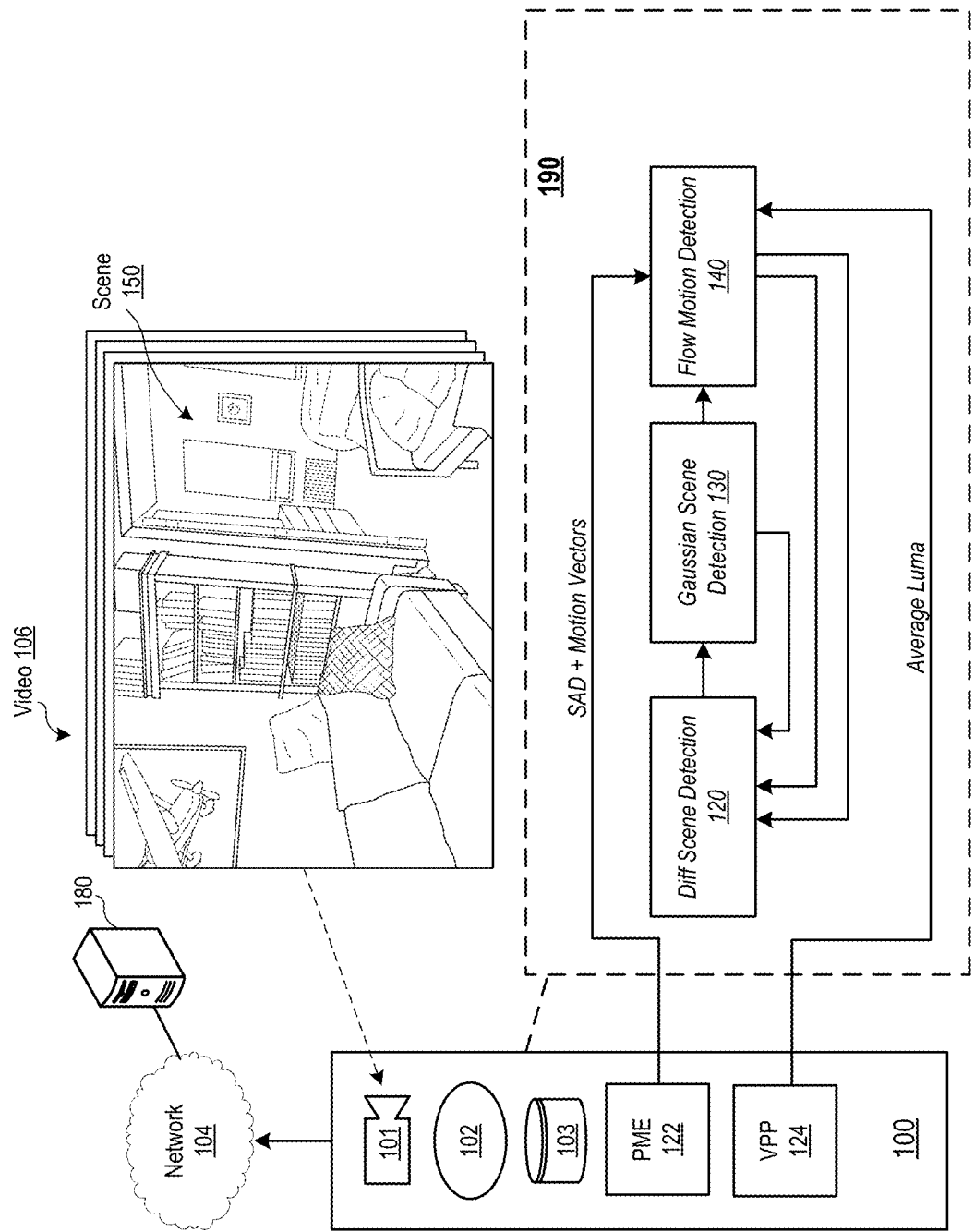
FIG. 1 is a system diagram showing an example system effective to detect a scene change in image data, arranged in accordance with various aspects of the present disclosure.

FIG. 1 is a diagram showing an example system 100, arranged in accordance with various aspects of the present disclosure. In various examples, system 100 may comprise a camera 101, one or more processing elements 102, a memory 103, a premotion estimator (PME) 122 and/or a video pre-processor (VPP) 124. In some embodiments, the system 100 can be utilized for surveillance or home security. In various examples, one or more of the image processing techniques described herein may be performed by a processing element 102 included within a housing of system 100, which may be positioned at the location where the images are being acquired by the camera 101. In other examples, one or more of the image processing techniques described herein may be performed by a computing device accessible via a communications network, such as computing device 180 accessible over network 104. Accordingly, as depicted in FIG. 1, in some examples, system 100 may send image data over network 104 to one or more computing devices 180 for image processing. In other examples, system 100 may comprise one or more processors and/or a memory effective to perform the various image processing techniques described herein. In various examples, the techniques described herein may be used to determine what image data to send over network 104 to one or more computing devices 180 for further processing. In various examples, computing devices 180 may perform action recognition image processing, human detection, pet detection, and/or other image processing techniques. Accordingly, as described in further detail below, the various techniques described herein may conserve bandwidth and selectively reduce the amount of image data streamed to remote computing devices 180 for remote processing. Additionally, the various techniques described herein may detect scene changes of interest and/or significant motion within a scene 150 representing a physical environment. Video of scene changes and/or significant motion may be streamed to one or more remote computing devices 180 and may be available for viewing by a user of system 100. Additionally, according to the various techniques described herein, minor, insignificant motion between two or more frames may be disregarded and may not trigger system 100 to stream video to remote computing devices, further conserving bandwidth and/or remote processing resources.

Network 104 may be, for example, the internet, an intranet, a wide area network, a local area network, or the like. In some examples, system 100 may be effective to send and receive data over network 104. The one or more processing elements 102 of system 100 may be effective to execute one or more instructions stored in memory 103 to cause the one or more processing elements 102 to execute various methods as described in further detail below. In FIG. 1, examples of a process flow 190 that may be executed by the one or more processing elements 102 are depicted within a dashed box to indicate that actions in process flow 190 may be executed by one or more components of system 100. In at least some examples and as described in further detail below, the various methods may comprise one or more processes, examples of which are referred to herein as Differential Scene Detection 120, Gaussian Scene Detection 130 and/or Flow Motion Detection 140. Memory 103 may store the executable instructions used to execute the various methods described herein. In addition, memory 103 may store various outputs and parameters related to the various methods described herein. Additionally, as described in further detail below, each of Differential Scene Detection 120, Gaussian Scene Detection 130, and/or Flow Motion Detection 140 may represent a state of process flow 190. In various examples, the processing of process flow 190 may remain in a state until that state is "triggered" or until the current state times out, at which time process flow 190 may transition to a different state. In at least some examples and as described in further detail below, when a state is triggered or times out, process flow 190 may transition to a different state or may remain in the current state.

Camera 101 may include, for example, a digital camera module. The digital camera module may comprise any suitable type of image sensor device or devices, such as a charge coupled device (CCD) and/or a complementary metal-oxide semiconductor (CMOS) sensor effective to capture image data from a local environment of camera 101. For example, camera 101 may include one or more lenses and may be positioned so as to capture images of a portion of the environment disposed along an optical axis (e.g., a light path) of camera 101. In the example depicted in FIG. 1, camera 101 may be positioned so as to capture video (e.g., frames of image data) representing an in-door environment (e.g., a portion of an interior of the user's home). Camera 101 may be a dual mode camera device effective to operate in a day mode and a night mode. During day mode operation (sometimes referred to as "RGB mode" operation), an IR cut filter may be interposed in the light path of camera 101 to block infrared light from reaching an image sensor of camera 101. While in day mode, an image signal processor (ISP) of the camera 101 may adjust various parameters of the camera 101 in order to optimize image quality for image data captured in day mode. For example, the frame rate of a video capture mode of camera 101 may be increased when switching from night mode to day mode.

During night mode operation (e.g., IR mode), the IR cut filter may be removed from the light path of camera 101. Accordingly, camera 101 may detect infrared wavelength light in the infrared portion of the spectrum as well as other portions of the electromagnetic spectrum. In some examples, camera 101 may comprise an infrared light source effective to emit infrared light to illuminate the scene 150 while in night mode. In some other examples, camera 101 may be configured in communication with an external infrared light source. In various examples, camera 101 and/or system 100 may cause an infrared light source to emit infrared light when camera 101 operates in night mode. Similarly, in various examples, when camera 101 is operated in day mode, infrared light emission by an infrared light source may be discontinued.

Camera 101 may be effective to generate a YUV histogram for each frame of image data captured. In some examples, the YUV histogram may comprise 256 bins representing the Y component (e.g., luminance), 128 bins representing the U component (e.g., chrominance) and 128 bins representing the V component (e.g., chrominance). Although particular numbers of bins for each component of the YUV histogram are discussed for illustrative purposes, it should be appreciated that any number of bins may be used, according to the desired implementation. Conceptually, the YUV histogram may be thought of as three separate histograms—one for the Y component, one for the U component and one for the V component. The horizontal axis of the histogram represents tonal values with each bin along the horizontal axis of the histogram representing a discrete tonal value. The vertical axis represents a value for the bin (e.g., a "bin value"). The bin value indicates the number of pixels in the frame of image data having the particular tonal value. Accordingly, the value of each bin of the YUV histogram represents the number of pixels in the frame having the particular luminance (or luma) or chrominance (or chroma) value of the bin.

In various examples, premotion estimator (PME) 122 may be effective to analyze frames of image data. PME 122 may be instituted as hardware (e.g., as a dedicated chip and/or integrated circuit) and/or as some combination of hardware and software. PME 122 may perform a block-matching process to match blocks between two frames of image data. For each matched block, PME 122 may generate a motion vector for the block. The motion vector may indicate the change in position of the block from the first frame to the second frame, as analyzed by the PME 122. Motion vectors may take the form $(d_x, d_y)$ where $d_x$ represents the change in horizontal block position (along the x axis) and $d_y$ represents the change in vertical block position (along the y axis) between the two frames being analyzed by PME 122. PME 122 may further generate a sum of absolute difference (SAD) of a motion-compensated residual for the pair of matching blocks. The SAD may represent the differences between the component image data of the two matched blocks being evaluated.

In various examples, video pre-processor (VPP) 124 may be effective to analyze one or more frames of image data to determine average luminance and/or luma values for macroblocks of pixels in the one or more frames. VPP 124 may be instituted as hardware (e.g., as a dedicated chip and/or integrated circuit) and/or as some combination of hardware and software. As described in further detail below, average luma may be used in a flow equation to determine a flow value F indicating significant scene change. Additionally, the average luma may be used when calculating the flow value F to account for different lighting conditions when determining motion in scene 150.

System 100 may be effective to determine whether or not a significant change in scene 150 has occurred using the process flow 190. Differential Scene Detection 120, Gaussian Scene Detection 130 and Flow Motion Detection 140 may each represent a state of process flow 190. In some examples, Differential Scene Detection 120 may be a default state. Accordingly, processing of process flow 190 by system 100 may begin at Differential Scene Detection 120. Differential Scene Detection 120 is described in further detail below with respect to FIG. 2.

Under various conditions Differential Scene Detection 120 may be triggered and processing may transition from the Differential Scene Detection 120 state to the Gaussian Scene Detection 130 state. If Differential Scene Detection 120 is not triggered, process flow 190 may remain in the Differential Scene Detection 120 state. Gaussian Scene Detection 130 may compare a YUV histogram of a current frame of image data to a background model of the environment (e.g., scene 150) to determine whether significant changes from the background model are present in the YUV histogram of the current frame. Gaussian Scene Detection 130 is described in further detail below in reference to FIGS. 3 and 4.

Under various conditions, the Gaussian Scene Detection 130 state may be triggered and processing may transition from the Gaussian Scene Detection 130 state to Flow Motion Detection 140 state. If the Gaussian Scene Detection 130 state is not triggered, processing may return to the Differential Scene Detection 120 state. Flow Motion Detection 140 may use inputs from PME 122 to analyze sequential frames of image data captured by camera 101. Flow Motion Detection 140 may calculate a flow value for each pair of matching blocks between the sequential frames using the SAD value, the motion vector, and the average luma for the pair of matching blocks. The total flow value for all pairs of matching blocks in the sequential frames may be determined. Various thresholding techniques described in further detail below may be used to determine if the Flow Motion Detection 140 state is triggered. If the Flow Motion Detection 140 state is triggered, system 100 may begin encoding and transmitting frames of image data over network 104 to one or more computing devices 180 for further image processing. Flow Motion Detection 140 is described in further detail below in reference to FIGS. 5 and 6.

Figure 2:
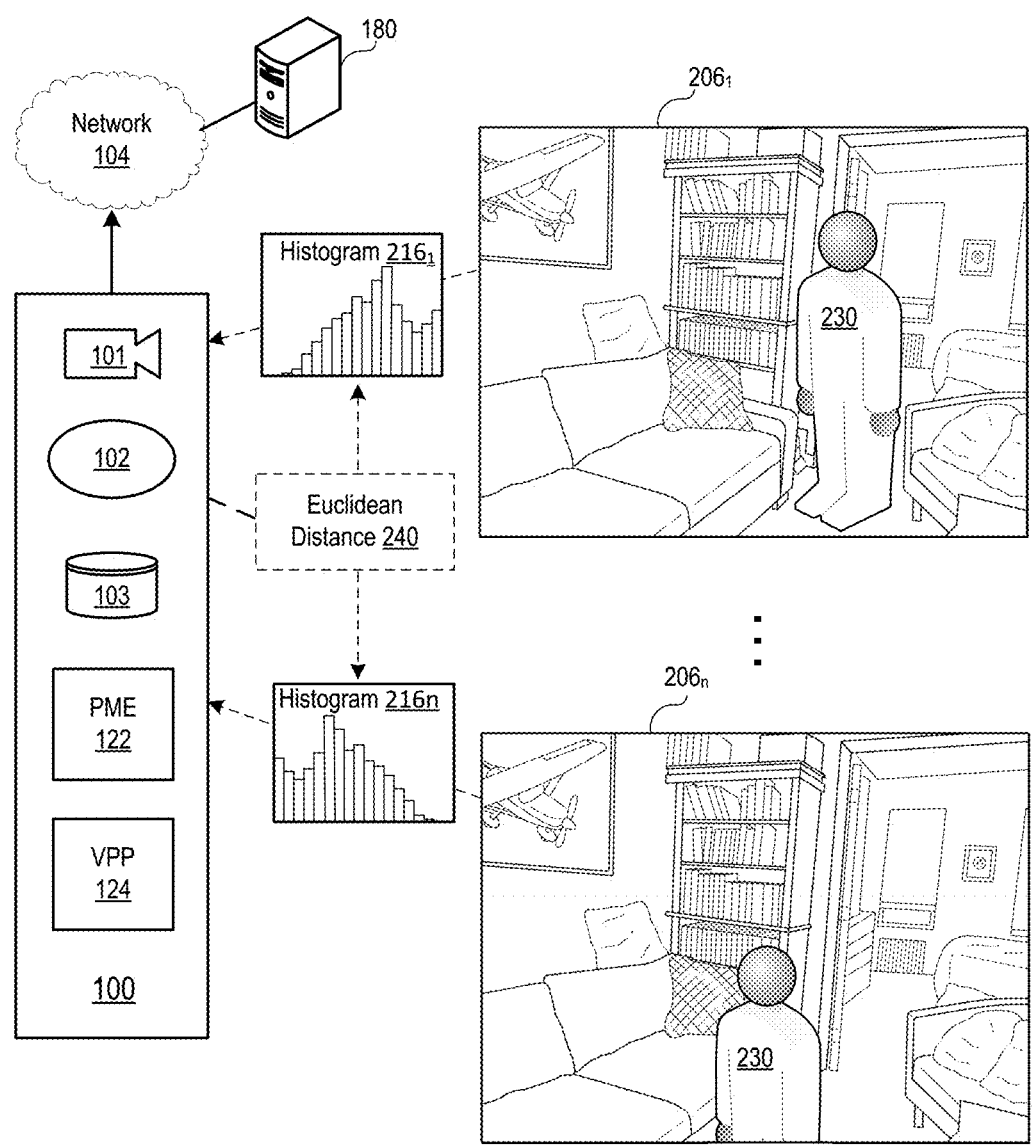
FIG. 2 depicts a method of detecting a distance between two histograms of image data, in accordance with various aspects of the present disclosure.

FIG. 2 depicts a method of detecting a distance between two histograms of image data, in accordance with various aspects of the present disclosure. FIG. 2 illustrates an example of the Differential Scene Detection 120 of process flow 190 described in FIG. 1. Camera 101 may be effective to capture frames $206_1$-$206_n$ of scene 150. As shown in the example illustration depicted in FIGS. 1 and 2, scene 150 may be a portion of an interior of an apartment or other dwelling. Accordingly, frames $206_1$-$206_n$ may be frames of image data captured of scene 150 over a period of time. In the example depicted in FIG. 2, in frame $206_1$, a FIG. 230 (e.g., a person) is standing at a first position in the scene 150. In frame $206_n$, captured at some point in time following frame $206_1$, the position of FIG. 230 has changed (e.g., FIG. 230 has moved). As described below, process flow 190 may be effective to determine whether the change in scene 150 between frame $206_1$ and frame $206_n$ is a significant change and whether the frames of image data representing the scene change should be encoded and transmitted over network 104 to one or more other computing devices for further processing and/or to make the frames available to one or more other computing devices.

In an example, frames $206_1$-$206_n$ may represent one second of video recorded at 30 frames per second resulting in 30 captured frames (e.g., n=30). Camera 101 and/or the one or more processors 102 may generate a YUV histogram for each of frames $206_1$-$206_n$. In the example depicted in FIG. 2, YUV histograms $216_1$-$216_n$ have been generated. Each of the YUV histograms $216_1$-$216_n$ corresponds to one of frames $206_1$-$206_n$. For example, a YUV histogram $216_1$ may be generated for frame $206_1$, a YUV histogram $216_2$ may be generated for frame $206_2$, etc. Differential Scene Detection 120 may perform an action 240. Action 240 may comprise determining the Euclidean distance between two histograms of two different frames of image data. In at least some examples, the two frames of image data may be non-consecutive frames in video 106, in order to reduce the processing load and/or power consumption of system 100. For example, there may be one or more intermediate frames of image data between the two frames for which the Euclidean distance is determined. For example, action 240 may be programmed to compare the histogram of a current frame with a histogram of a frame that is 30 frames prior to the current frame. In some other examples, action 240 may be selectively programmed to wait any number of frames and/or any amount of time between comparisons, as desired. In some examples, action 240 may be performed on histograms of consecutive frames, every 15 frames, every 25 frames, every 100 frames, etc. Similarly, action 240 may be performed on histograms of frames separated by 1 second, 2 seconds, 10 seconds, 0.5 seconds, etc.

The Euclidean distance may be the distance in multi-dimensional space between a first vector (e.g., a first Euclidean vector) representing the first YUV histogram being compared, and a second vector (e.g., a second Euclidean vector) representing the second YUV histogram being compared. If the Euclidean distance between the first histogram and the second histogram exceeds a scene difference threshold value (e.g., a programmable and/or predefined distance threshold), Differential Scene Detection 120 may be triggered and processing may transition from the Differential Scene Detection 120 state to the Gaussian Scene Detection 130 state, as depicted in FIG. 1. The scene difference threshold value may represent a minimum Euclidean distance between the histograms of two frames of image data indicative of significant motion in the physical environment represented between two or more frames of video data. The scene difference threshold may be a tunable parameter used as a gateway to control the transition between Differential Scene Detection 120 and Gaussian Scene Detection 130. Typically, more motion (e.g., changes in the physical environment in scene 150) occurring between two frames of image data will result in a larger Euclidean distance between the two frames. The Euclidean distance exceeding the scene difference threshold value may be an indication that a scene change has occurred between the frames with histograms being compared at action 240. Conversely, if the Euclidean distance between the first histogram and the second histogram does not exceed the scene difference threshold value, processing may remain in Differential Scene Detection 120 state and may continue to compare histograms of captured frames according to the parameters of Differential Scene Detection 120 (e.g., "compare the histogram of every 30th frame with the histogram of the frame 30 frames earlier"). When the Euclidean distance does not exceed the scene difference threshold value, it may be an indication that the scene change is not significant enough to warrant encoding the frames of image data and transmitting them over network 104 for further processing. In at least some examples, action 240 may separately determine the Euclidean distance between the two histograms for each of the Y, U and V components. In such examples, each component may have a separate threshold or an aggregated thresholding technique may be used.

Figure 3:
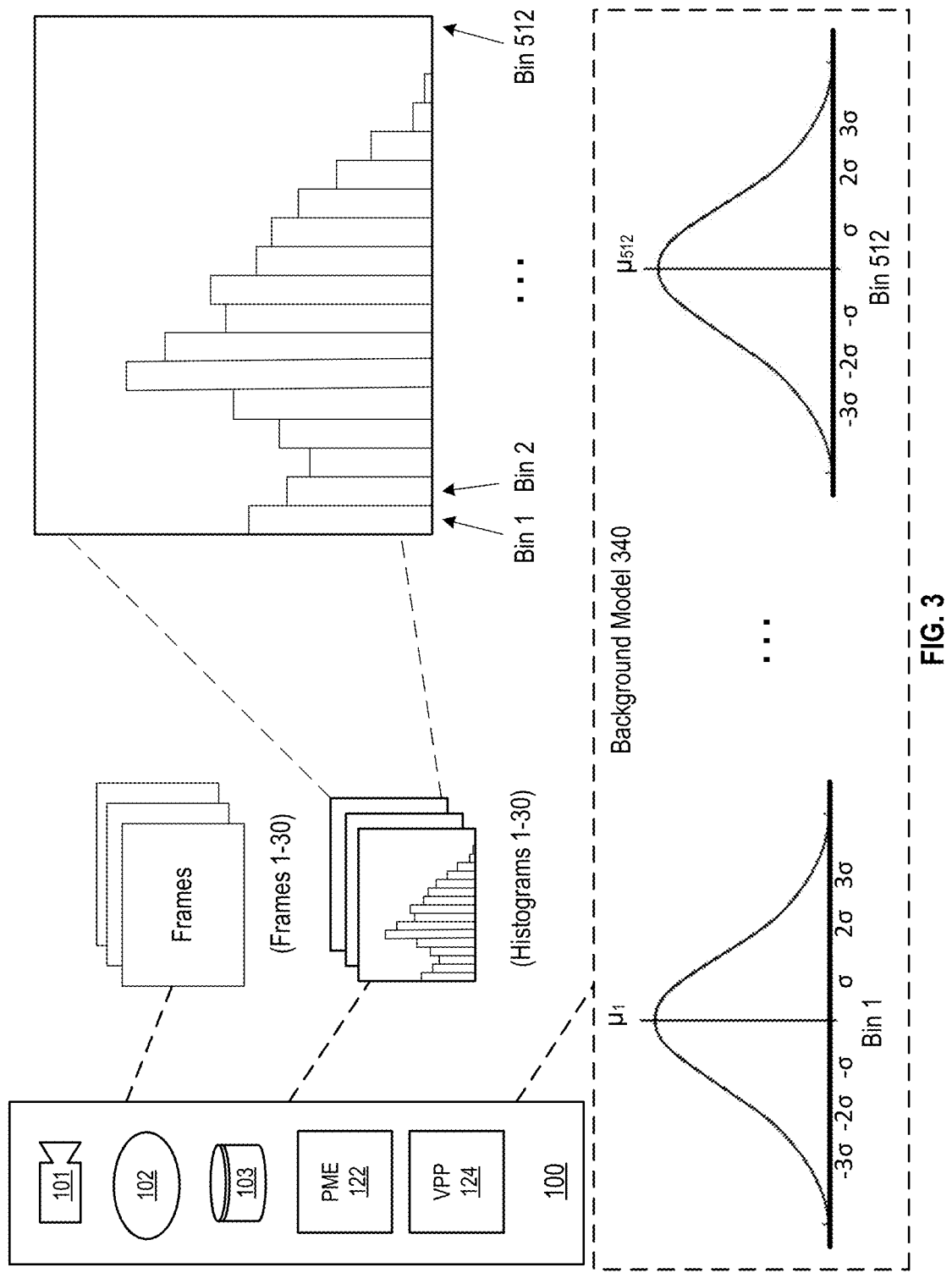
FIG. 3 illustrates Gaussian distributions representing histograms of sequential frames of image data, in accordance with various aspects of the present disclosure.

FIG. 3 illustrates a background model 340 comprising Gaussian distributions representing histograms of sequential frames of captured image data, in accordance with various aspects of the present disclosure. If Differential Scene Detection 120 is triggered, processing in process flow 190 may transition from the Differential Scene Detection 120 state to the Gaussian Scene Detection 130 state. A background model 340 of scene 150 may be generated either within the Gaussian Scene Detection 130 state or at various programmable time intervals. For example, a background model 340 of scene 150 may be generated once a day, once every 2 hours, once every week, once every 15 minutes, etc. The frequency of the generation of the background model 340 is a tunable parameter and any appropriate frequency may be used according to the desired application. Additionally, in at least some examples, the background model 340 may be generated in a calibration mode, upon powering up system 100, and/or upon a command received from a companion application or on an interface of system 100.

Generation of the background model 340 of scene 150 may comprise capturing n sequential frames of image data. In the example depicted in FIG. 3, n=30. Accordingly, frames 1-30 are captured. A YUV histogram of each of the n frames is generated. Accordingly, in the example depicted in FIG. 3, histograms 1-30 are generated, with histogram 1 corresponding to frame 1, histogram 2 corresponding to frame 2, etc. Each of the YUV histograms may have a certain number of bins representing values of the Y, U, and V components, as previously described herein. In the example depicted in FIG. 3, each of the YUV histograms 1-30 may be separated into 512 bins with 256 bins representing the Y component (e.g., luminance), 128 bins representing the U component (e.g., chrominance), and 128 bins representing the V component (e.g., chrominance). The bin values of each bin among the histograms of the n sequential frames may be approximated by the one or more processors 102 as a Gaussian distribution. Accordingly, as depicted in FIG. 3, a Gaussian distribution is generated for Bin 1, Bin 2, . . . , Bin 512, resulting in 512 Gaussian distributions. In the example depicted in FIG. 3, the Gaussian distribution for Bin 1 may comprise the 30 different histogram values of Bin 1 in the histograms for frames 1-30. The Gaussian distribution for Bin 2 may comprise the 30 different values of Bin 2 in frames 1-30, and so on. Additionally, a mean value p and standard deviation a are determined for each of the bins.

Figure 4:
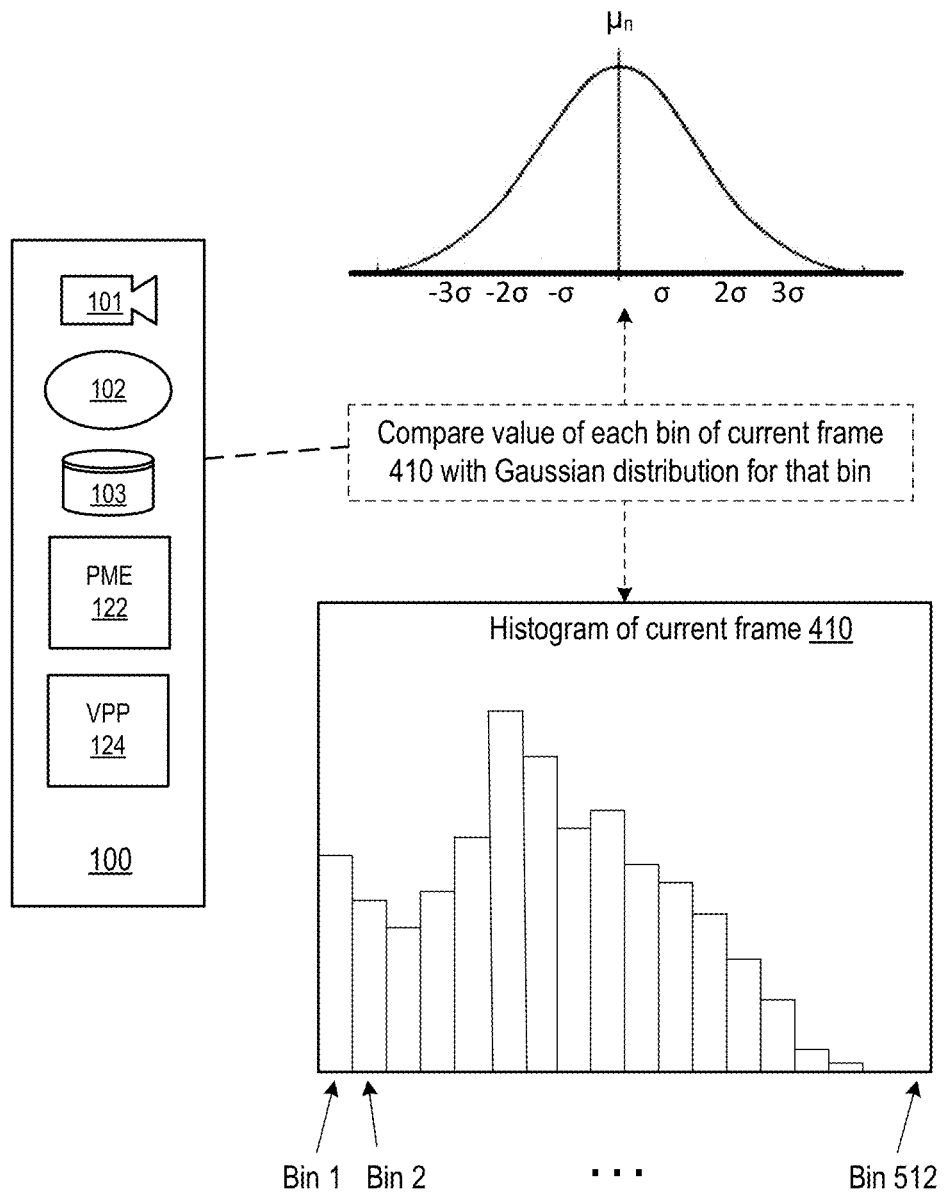
FIG. 4 is an illustration of a technique for comparing a histogram of image data to a background model of a scene, in accordance with various aspects of the present disclosure.

FIG. 4 is an illustration of a technique for comparing a histogram of image data to a background model of a scene, in accordance with various aspects of the present disclosure. When the state of process flow 190 transitions from Differential Scene Detection 120 to Gaussian Scene Detection 130, Gaussian Scene Detection 130 may compare the value of each bin of the histogram of the current frame 410 of video 106 to the Gaussian distribution of the background model that corresponds to that bin. If the value of a particular bin of the histogram of the current frame 410 diverges from the mean p for that bin by greater than a threshold amount, that bin may be considered to be "violated." For example, if the value of a particular bin of the histogram of the current frame 410 is outside of a standard deviation band (e.g., outside +/−3σ) of the Gaussian distribution corresponding to the bin, the bin may be violated. The deviation band may represent a particular deviation from the mean value for a given Gaussian distribution. For example, the deviation band may be from −σ to +σ, from −2σ to +2σ, from −3σ to +3σ, or some other band of values. If greater than a threshold number of bins are violated, Gaussian Scene Detection 130 may be triggered and processing in process flow 190 may transition from the Gaussian Scene Detection 130 state to Flow Motion Detection 140 state.

For example, if the value in bin 5 for the histogram of current frame 410 is outside a deviation band (e.g., less than −3σ or is greater than 3σ) for the corresponding Gaussian distribution of bin 5, bin 5 of the histogram of current frame 410 may be violated. It should be appreciated that the +/−3σ deviation band is an example and that other thresholds and/or deviation bands may be used depending on the desired application and to tune the sensitivity of the scene change detection techniques described herein. For example, +/−2σ, +/−σ, +/−0.5σ etc. may be used in various other examples. Additionally, the number of bins of the histogram of current frame 410 that are required to violate the background model before Gaussian Scene Detection 130 is triggered (e.g., # of bins threshold) may be tunable according to the desired application and/or desired sensitivity of the scene change detection techniques described herein. For example, # of bins threshold may be equal to 10, 20, 30, 35, 41, or any other desired number of bins.

Figure 5:
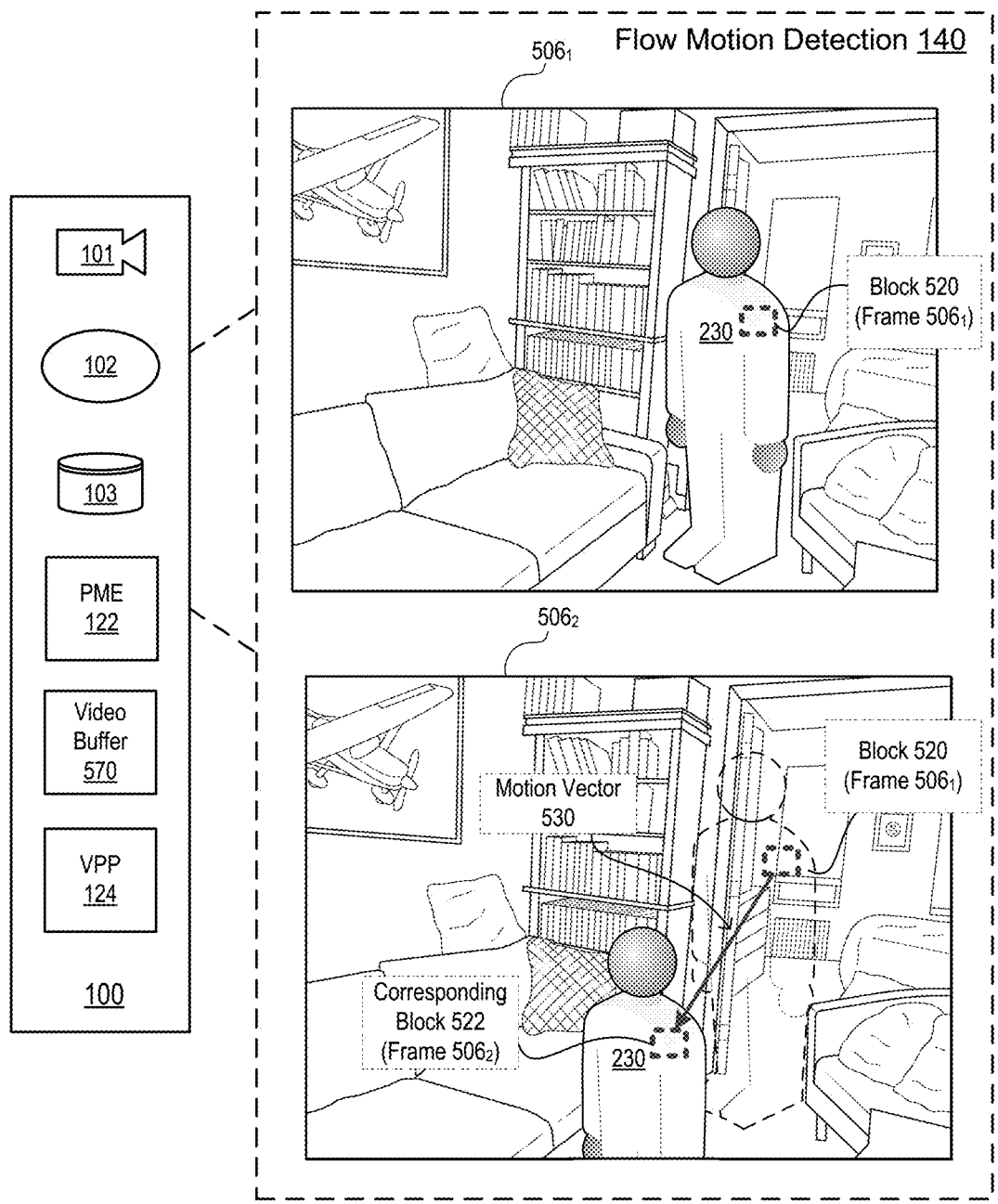
FIG. 5 depicts two frames of image data that may be used to detect changes in a scene in accordance with various aspects of the present disclosure.

FIG. 5 depicts two frames $506_1$-$506_2$ of image data that may be used to detect changes in a scene in accordance with various aspects of the present disclosure. When the state of process flow 190 transitions from Gaussian Scene Detection 130 to Flow Motion Detection 140, PME 122 may perform block matching on two frames of image data. In the example depicted in FIG. 5, PME 122 may perform a block-matching process to match blocks of pixels between a first frame $506_1$ and a second subsequent frame $506_2$. Various block matching techniques known in the art may be used in accordance with the present disclosure, such as, for example, the exhaustive search algorithm, optimized hierarchical block matching (OHBM), three step search algorithm, two-dimensional logarithmic search, etc. Matched blocks may be blocks determined by PME 122 and/or the one or more processors 102 as including the same and/or minimally different image data. Frames $506_1$ and $506_2$ may be frames of image data representing scene 150. For each pair of matched blocks, PME 122 may generate a motion vector for the pair. The motion vector may indicate the change in position of the matching blocks from the first frame to the second frame, as analyzed by the PME 122. Motion vectors may take the form ($d_x$, $d_y$) where $d_x$ represents the shift in horizontal block position (along the x axis) and $d_y$ represents the shift in vertical block position (along the y axis) between the two frames being analyzed by PME 122. PME 122 may further generate a sum of absolute differences (SAD) of a motion-compensated residual for the pair of matching blocks. The SAD may represent the differences between the component image data of the two matched blocks. In some examples, SAD may be calculated by taking the absolute difference between each pixel in the matching pair of blocks.

In the example depicted in FIG. 5, PME 122 may match blocks of image data in frame $506_1$ with blocks of image data in frame $506_2$. In the example depicted in FIG. 5, the frames $506_1$ and $506_2$ may be sequential and/or consecutive frames. Block 520 in frame $506_1$ may represent a portion of the standing FIG. 230. It should be noted that the size of block 520, as depicted in FIG. 5, is for illustrative purposes and may not be drawn to scale. PME 122 may match block 520 to corresponding block 522 in frame $506_2$. The dashed outline of FIG. 230 in frame $506_2$ is used to depict the position of FIG. 230 in frame $506_1$, so that the movement of FIG. 230 between frame $506_1$ and frame $506_2$ may be more easily visualized. Additionally, the dashed figure in frame $506_2$ is used to illustrate motion vector 530, representing the change in position or location ($d_x$, $d_y$) between block 520 in frame $506_1$ and corresponding (e.g., matching) block 522 in frame $506_2$. Block 522 may represent the same portion of the physical environment (e.g., the same portion of standing FIG. 230) as block 520, albeit at a subsequent point in time as frame $506_2$ may be subsequent to frame $506_1$ in the video data.

Motion vectors may generally provide a good indicator of rigid movement between frames involving a translation of an object across the frame. A person slowly rolling by a white background on a skateboard may be an example of a rigid movement. In such an example, matching blocks between two frames representing the moving person may have very low or zero residuals (e.g., SAD). Additionally, the motion vector between the two matching blocks may be large. On the other hand, during non-rigid movements the motion vector may be low and the SAD between matching blocks may be high and thus SAD may be a bigger indicator of the movement in-scene. An example of a non-rigid movement may be bending movements, movements that are moving quickly towards or away from the camera, and/or other non-translational movements. Additionally, the luminance of the frames and/or blocks of image data may affect the SAD values of the matching blocks.

As described in further detail below, Flow Motion Detection 140 may determine a "flow" between matching blocks using motion vectors between the matching blocks, SAD between matching blocks, and average luma of one or both of a pair of matching blocks. Flow may be a value that represents differences between pairs of matched macroblocks between frames of image data of video 106. Flow may be an indicator of motion between frames of a scene 150. As used herein, "flow" may differ from optical flow, as optical flow typically refers to a computed vector from one block to another block along with a separate residual value. Optical flow is generally noisy, as motion vectors alone can be noisy especially under different lighting conditions. As such, optical flow does not provide for accurate motion estimation, particularly under different lighting sources. By contrast, "flow", as used herein, is calculated using motion vectors, SAD, and average luma to account for different lighting conditions according to Equation (1), below. Additionally, "flow", as used herein, provides for accurate motion estimation in scene 150. Flow may be determined for each pair of matching blocks in the frames being compared. For example, in FIG. 5, flow may be determined for each pair of matching blocks from frame $506_1$ and $506_2$. Flow may be accumulated in a buffer or other memory. As described in further detail below, various thresholding techniques may be used to determine whether the flow between two frames of image data indicates a significant scene change. If a determination is made that a significant scene change is occurring (e.g., if the one or more thresholds are exceeded by the determined flow), system 100 may encode and transmit frames of image data over network 104 to one or more computing devices 180 for further image processing and/or to make the video 106 or a portion thereof available to a device that is remote from system 100. In at least some examples, system 100 may include a video buffer 570. Video buffer 570 may store one or more previously captured frames of image data of scene 150. In at least some examples, if Flow Motion Detection 140 is triggered (e.g., using the techniques described in FIG. 6 and elsewhere within the disclosure), one or more of the previously captured frames stored in video buffer 570 may be encoded and transmitted over network 104 to one or more computing devices 180 to depict motion occurring in scene 150 during the relevant time period (e.g., during the time period where significant motion in-scene is occurring).

Figure 6:
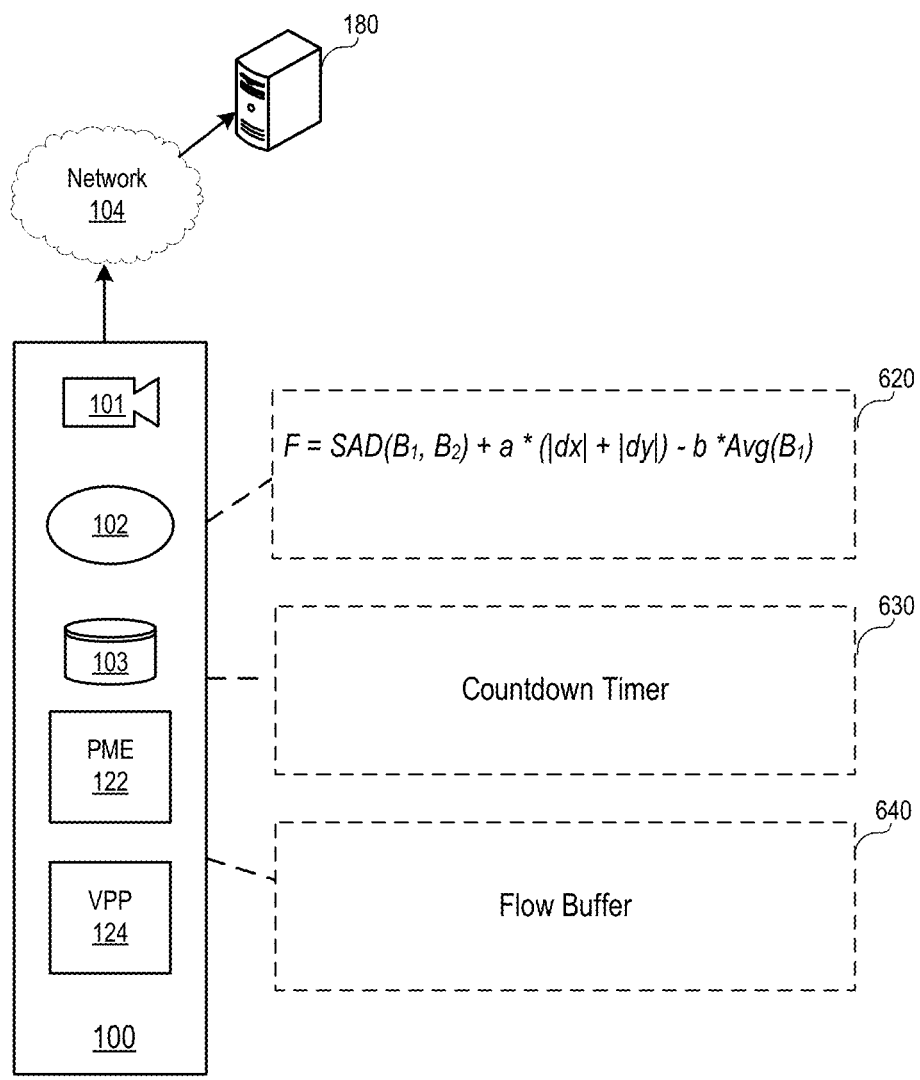
FIG. 6 depicts an example of a process that may be used to determine whether or not to stream video to one or more remote computing devices in accordance with various aspects of the present disclosure.

FIG. 6 depicts an example of a Flow Motion Detection process 140 that may be used to determine whether or not to stream video to one or more remote computing devices in accordance with various aspects of the present disclosure. Equation 620 may be used to determine flow F for each pair of matching blocks between two frames of image data representing a scene 150. Equation 620 is depicted as Equation (1) below:

$$F = SAD(B_1, B_2) + a^*(|b_x| + |d_y|) - b^* \text{Avg}(B_1) \qquad (1)$$

The first term in equation 620—$SAD(B_1, B_2)$—represents the SAD between matching blocks $B_1$ and $B_2$ (e.g., block 520 and block 522). The second term in equation 620 ($|bx|+|dy|$)—represents the magnitude of the motion vector determined by PME 122 between blocks $B_1$ and $B_2$ (e.g., motion vector 530). The third term—$\text{Avg}(B_1)$—represents the average luma for one of the matching blocks of image data and may be used to account for the lighting conditions on the scene 150. The tunable parameters a and b are weight value coefficients that may be used to normalize the three terms of equation 620 to the same space and to weight the various terms.

While process flow 190 is in Flow Motion Detection 140 state, flow F may be calculated for each pair of matching blocks for two frames of image data. Flow F may be accumulated in flow buffer 640. Flow buffer 640 may be a memory associated with system 100. As described below, the current accumulated value of flow F stored in flow buffer 640 may be used to determine whether or not the Flow Motion Detection 140 state is triggered. Once the Flow Motion Detection 140 state is triggered, system 100 may begin encoding and transmitting video 106 (e.g. streaming video) over network 104 to one or more computing devices 180, as described previously. Additionally, as previously described, when the Flow Motion Detection 140 state is triggered, one or more of the previously captured frames stored in video buffer 570 may be encoded and transmitted over network 104 to one or more computing devices 180 to depict motion occurring in scene 150 during the relevant time period, which may have occurred prior to the Flow Motion Detection 140 state experiencing a trigger.

Countdown timer 630 may be used to determine an amount of time that the process flow 190 has been in the Flow Motion Detection 140 state since the last time that Flow Motion Detection 140 was triggered. Flow Motion Detection 140 may be triggered in various ways. In one example, once process flow 190 is inside the Flow Motion Detection 140 state, countdown timer 630 may begin a countdown of time length t. The length t of the countdown timer 630 may be a tunable parameter and may be set to a desired value depending on the desired application. In an illustrative example, the countdown timer may be set to a length t=7 seconds. In some examples, Flow Motion Detection 140 state may calculate flow F for sequential frames captured by camera 101, while countdown timer 630 is counting down. In some other examples, Flow Motion Detection 140 state may calculate flow F for frames sampled by camera 101 at various time intervals, while countdown timer 630 is counting down. Flow F may be determined and accumulated in flow buffer 640. In one example, if the value of F stored in flow buffer 640 exceeds a predetermined flow threshold value, Flow Motion Detection 140 state may be triggered and system 100 may begin encoding and transmitting frames of video 106, as described above. In various examples, when Flow Motion Detection 140 state is triggered, the countdown timer 630 may be reset. Similarly, when Flow Motion Detection 140 state is triggered, the Flow Buffer 640 may be emptied (e.g., flushed and/or reset to an initial flow value F such as 0 or another value).

If the countdown timer 630 expires without the value F stored in Flow Buffer 640 exceeding the predetermined flow threshold value, process flow 190 may return from Flow Motion Detection 140 state to Differential Scene Detection 120 state, as depicted in FIG. 1. In various examples, if system 100 has been streaming video 106 for more than a threshold amount of time (e.g., >1 minute, 2 minutes, 45 seconds, etc.) due to a plurality of triggers experienced while process flow 190 is in the Flow Motion Detection 140 state, process flow 190 may transition from Flow Motion Detection 140 state to Differential Scene Detection 120 state to ensure that Differential Scene Detection 120 state, Gaussian Scene Detection 130 state and Flow Motion Detection 140 state remain triggered. The threshold amount of time is also a tunable parameter and may be adjusted as desired according to the particular application.

In another example, instead of using a single predetermined threshold value to trigger Flow Motion Detection 140, high and low thresholds and high and low block counts may be used to trigger Flow Motion Detection 140. Using high and low thresholds and high and low block counts may provide an adaptive means for triggering Flow Motion Detection 140. As described below, fewer blocks may be required to violate a high threshold in order to trigger Flow Motion Detection 140 while more blocks may be required to violate a low threshold in order to trigger Flow Motion Detection 140. For example, a high threshold may be a threshold flow value $F_{High}$. If a pair of matching blocks is determined to have a flow F that is greater than $F_{High}$, a high threshold block counter $C_{High}$ may be incremented or otherwise increased. If the value of $C_{High}$ exceeds a $C_{High}$ threshold value $C_{high\_thresh}$, Flow Motion Detection 140 may be triggered. Similarly, a low threshold may be a threshold flow value $F_{low}$ where $F_{High} > F_{low}$. If a pair of matching blocks is determined to have a flow F that is greater than $F_{low}$ a low threshold block counter $C_{low}$ may be incremented or otherwise increased. If the value of $C_{low}$ exceeds a $C_{low}$ threshold value $C_{low}$ thresh, Flow Motion Detection 140 may be triggered. In the example, $C_{low\_thresh}$ may be greater than $C_{high\_thresh}$ such that more blocks are required to violate the low threshold $F_{low}$ to trigger Flow Motion Detection 140 relative to the number of blocks required to violate the high threshold $F_{High}$ to trigger Flow Motion Detection 140.

Once Flow Motion Detection 140 state is triggered, system 100 may stream video 106 for a predefined amount of time (e.g., 15, 20, 22, 40 seconds, or some other amount of time). In various examples, every subsequent trigger of Flow Motion Detection 140 after streaming has commenced may cause system 100 to stream video 106 for an additional amount of time equal to the predefined amount of time. For example, system 100 may stream video 106 to one or more computing devices 180 for 20 seconds upon Flow Motion Detection 140 state being triggered. During the 20 seconds, if Flow Motion Detection 140 state is again triggered, system 100 may stream video 106 for an additional 20 seconds. If at the expiration of the predefined streaming time Flow Motion Detection 140 state has not been triggered, system 100 may cease streaming until Flow Motion Detection 140 is next triggered. For example, if system 100 has been streaming video 106 for 20 seconds without Flow Motion Detection 140 being triggered, system 100 may cease streaming video 106.

Figure 7:
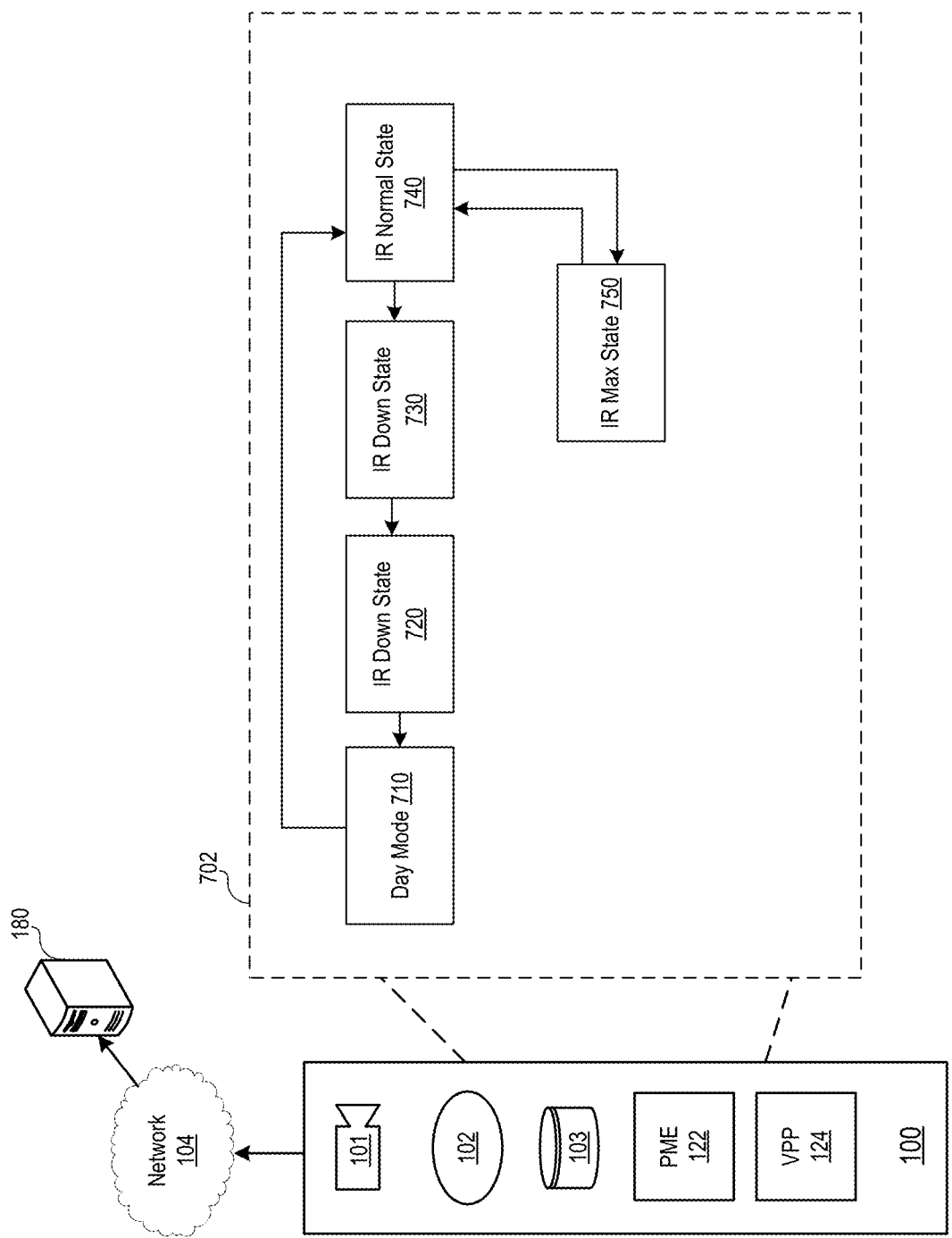
FIG. 7 depicts an example of various infrared illumination states that may be used to control streaming of video in accordance with various aspects of the present disclosure.

FIG. 7 depicts an example of various infrared illumination states that may be used to control streaming of video in accordance with various aspects of the present disclosure.

The output of PME 122 may experience significant noise during illumination changes. For example, when camera 101 changes from night mode with IR illumination source to day mode without IR illumination, output of PME 122 may be unstable. Generally, significantly changing the amount of IR illumination on the scene 150 may cause error in the output of PME 122 (e.g., in the motion vectors and SAD determined by PME 122). Accordingly, process 702 depicted in FIG. 7 may be used to reduce the triggering of Flow Motion Detection 140, Differential Scene Detection 120, and/or Gaussian Scene Detection 130 due to changes in IR illumination.

Day mode 710 may indicate that camera 101 is operating in day mode (e.g., with no IR illumination and/or with an IR illumination cut filter positioned along the optical path of the image sensor of camera 101). Camera 101 may transition from day mode 710 to IR normal state 740 (e.g., night mode). For example, camera 101 may transition from day mode to night mode based on an ambient light sensor detecting low visible light levels in scene 150. In IR normal state 740, IR light may be projected onto scene 150. The changing light condition may cause PME 122 to experience error and generate noisy output. Accordingly, after transitioning from day mode 710 to IR normal state 740, frames may be designated as "unstable" for a predefined period of time. The amount of time may be a tunable parameter and any suitable amount of time may be used. For example, after transitioning from day mode 710 to IR normal state 740, frames may be designated as "unstable" for 3 seconds. As such, if camera 101 is capturing frames of image data at 30 frames-per-second, 90 frames may be designated as unstable. If system 100 is currently streaming video 106 and an unstable frame is detected, streaming may be ceased. Additionally, in at least some examples, the state of process flow 190 may transition from Flow Motion Detection 140 to Differential Scene Detection 120. Further, in at least some examples, system 100 may flush flow buffer 640 upon detection of an unstable frame.

IR down state 720 and IR down state 730 may be transitional states between IR normal state 740 and day mode 710. Although two states 720 and 730 are depicted, any number of transitional states may be used in accordance with various different embodiments. Frames captured by camera 101 during transitional states where the amount of IR light projected and/or other light on the scene 150 is changing may be designated as unstable frames. Accordingly, upon a determination that an unstable frame has been captured streaming may be ceased and/or the current state of process flow 190 may transition to Differential Scene Detection 120. Additionally, after transitioning from IR max state 750 (where IR illumination is at a maximum) to IR normal state 740, frames may be designated as "unstable" for a predefined period of time. The amount of time may be a tunable parameter and any suitable amount of time may be used. For example, after transitioning from IR max state 750 to IR normal state 740, frames may be designated as "unstable" for 3 seconds. Upon detection of unstable frames, streaming may be ceased, the current state of process flow 190 may transition to Differential Scene Detection 120, and flow buffer 640 may be flushed (e.g., the value stored in flow buffer 640 may be deleted and/or reset to an initial value).

The exposure time of camera 101 may be changed at various times. For example, the exposure time of camera 101 may be automatically adjusted when transitioning from night mode to day mode and when transitioning from day mode to night mode to account for changing external light conditions. Camera 101 may send a signal or other indication to processor 102 to indicate that the exposure of camera 101 is changing. Upon receiving a signal indicating that the exposure is changing, processor 102 may flush flow buffer 640. If system 100 is currently streaming video 106 when the signal indicating an exposure change is received, system 100 may not necessarily stop streaming immediately due to the changing exposure of camera 101. However, as described above, since Flow Motion Detection 140 triggers upon the value F stored in Flow Buffer 640 exceeding one or more predetermined flow threshold values, flushing the flow buffer 640 may result in Flow Motion Detection 140 not being triggered which may in turn contribute to the cessation of streaming.

Figure 8:
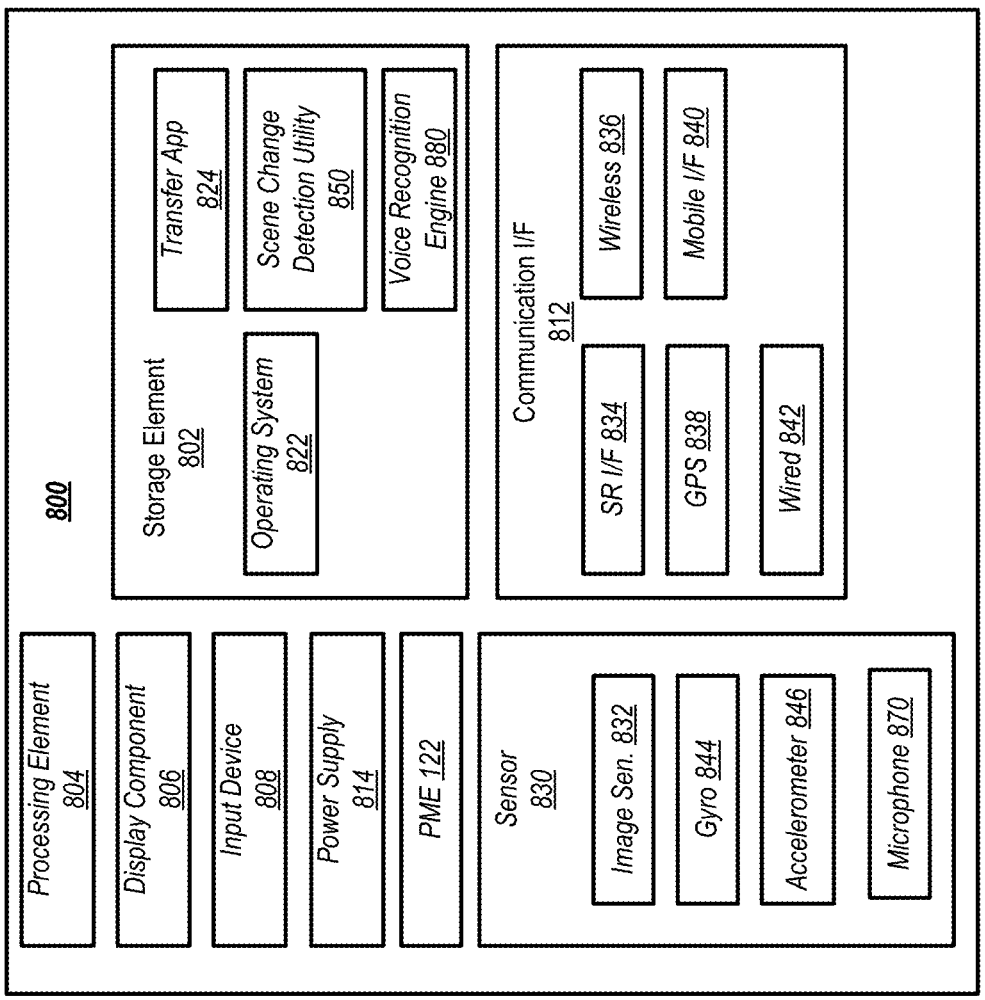
FIG. 8 is a block diagram showing an example architecture of a computing device in which the system described in the present disclosure, or a portion thereof, may be implemented, in accordance with various embodiments described herein.

FIG. 8 is a block diagram showing an example architecture 800 of a user device, such as the image capture devices, processors, mobile devices, and other computing devices described herein. It will be appreciated that not all user devices will include all of the components of the architecture 800 and some user devices may include additional components not shown in the architecture 800. The architecture 800 may include one or more processing elements 804 for executing instructions and retrieving data stored in a storage element 802. The processing element 804 may comprise at least one processor. Any suitable processor or processors may be used. For example, the processing element 804 may comprise one or more digital signal processors (DSPs) and/or image signal processors (ISPs). In some examples, the processing element 804 may be effective to filter image data into different frequency bands, as described above. The storage element 802 can include one or more different types of non-transitory, computer-readable memory, data storage, or computer-readable storage media devoted to different purposes within the architecture 800. For example, the storage element 802 may comprise flash memory, random-access memory, disk-based storage, etc. Different portions of the storage element 802, for example, may be used for program instructions for execution by the processing element 804, storage of images or other digital works, and/or a removable storage for transferring data to other devices, etc.

The storage element 802 may also store software for execution by the processing element 804. An operating system 822 may provide the user with an interface for operating the user device and may facilitate communications and commands between applications executing on the architecture 800 and various hardware thereof. A transfer application 824 may be configured to receive images and/or video from another device (e.g., a mobile device, image capture device, and/or display device) or from an image sensor 832 included in the architecture 800 (e.g., camera 101). In some examples, the transfer application 824 may also be configured to upload the received images to another device that may perform processing as described herein (e.g., a mobile device and/or another computing device).

In some examples, storage element 802 may include a scene change detection utility 850. The scene change detection utility 850 may be configured to determine significant changes in scene 150 and may control the streaming of video 106 to one or more remote computing devices (e.g., computing devices 180) over network 104, in accordance with the various techniques described herein. For example, scene change detection utility 850 may perform the Differential Scene Detection 120, Gaussian Scene Detection 130, and/or Flow Motion Detection 140 techniques described herein.

When implemented in some user devices, the architecture 800 may also comprise a display component 806. The display component 806 may comprise one or more light-emitting diodes (LEDs) or other suitable display lamps. Also, in some examples, the display component 806 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 800 may also include one or more input devices 808 operable to receive inputs from a user. The input devices 808 can include, for example, a push button, touch pad, touch screen, wheel, joystick, keyboard, mouse, trackball, keypad, light gun, game controller, or any other such device or element whereby a user can provide inputs to the architecture 800. These input devices 808 may be incorporated into the architecture 800 or operably coupled to the architecture 800 via wired or wireless interface. In some examples, architecture 800 may include a microphone 870 for capturing sounds, such as voice commands. Voice recognition engine 880 may interpret audio signals of sound captured by microphone 870. In some examples, voice recognition engine 880 may listen for a "wake word" to be received by microphone 870. Upon receipt of the wake word, voice recognition engine 880 may stream audio to a voice recognition server for analysis. In various examples, voice recognition engine 880 may stream audio to external computing devices via communication interface 812.

When the display component 806 includes a touch-sensitive display, the input devices 808 can include a touch sensor that operates in conjunction with the display component 806 to permit users to interact with the image displayed by the display component 806 using touch inputs (e.g., with a finger or stylus). The architecture 800 may also include a power supply 814, such as a wired alternating current (AC) converter, a rechargeable battery operable to be recharged through conventional plug-in approaches, or through other approaches such as capacitive or inductive charging.

The communication interface 812 may comprise one or more wired or wireless components operable to communicate with one or more other user devices. For example, the communication interface 812 may comprise a wireless communication module 836 configured to communicate on a network, such as the network 104, according to any suitable wireless protocol, such as IEEE 802.11 or another suitable wireless local area network (WLAN) protocol. A short range interface 834 may be configured to communicate using one or more short range wireless protocols such as, for example, near field communications (NFC), Bluetooth, Bluetooth LE, etc. A mobile interface 840 may be configured to communicate utilizing a cellular or other mobile protocol. A Global Positioning System (GPS) interface 838 may be in communication with one or more earth-orbiting satellites or other suitable position-determining systems to identify a position of the architecture 800. A wired communication module 842 may be configured to communicate according to the USB protocol or any other suitable protocol. In various examples where architecture 800 represents camera 101 (shown in FIG. 1), mobile interface 840 may allow camera 101 to communicate with one or more other computing devices such as computing devices 180 shown in FIG. 1. For example, camera 101 may receive a command from a user device, an application of a user device, or a voice recognition server to capture an image or video. Camera 101 may receive a command from the user device to send the captured image or video to the mobile device or to another computing device.

The architecture 800 may also include one or more sensors 830 such as, for example, one or more position sensors, image sensors, and/or motion sensors. An image sensor 832 is shown in FIG. 8. Some examples of the architecture 800 may include multiple image sensors 832. For example, a panoramic camera system may comprise multiple image sensors 832 resulting in multiple images and/or video frames that may be stitched and may be blended to form a seamless panoramic output. An example of an image sensor 832 may be camera 101 shown and described in FIG. 1. As described, camera 101 may be configured to capture color information, IR image data, image geometry information, and/or ambient light information.

Motion sensors may include any sensors that sense motion of the architecture including, for example, gyro sensors 844 and accelerometers 846. Motion sensors, in some examples, may be used to determine an orientation, such as a pitch angle and/or a roll angle, of camera 101 (shown in FIG. 1). The gyro sensor 844 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 846 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 838 may be utilized as a motion sensor. For example, changes in the position of the architecture 800, as determined by the GPS interface 838, may indicate the motion of the GPS interface 838. As described, in some examples, image sensor 832 may be effective to detect infrared light. In at least some examples, architecture 800 may include an infrared light source to illuminate the surrounding environment.

Figure 9:
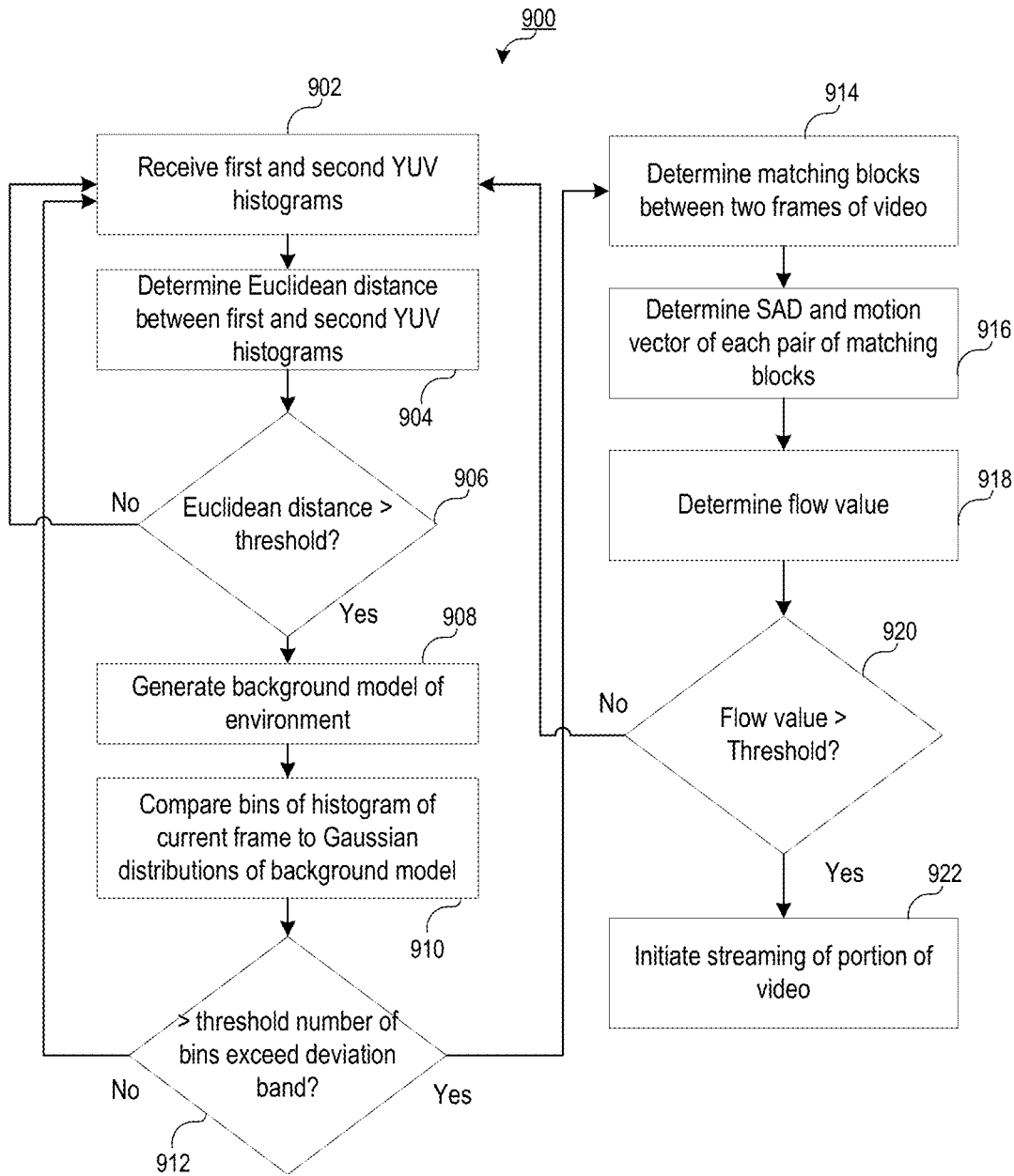
FIG. 9 depicts a flow chart showing an example process for detecting scene change in image data, in accordance with various aspects of the present disclosure.

FIG. 9 depicts a flow chart showing an example process for detecting scene change in image data, in accordance with various aspects of the present disclosure. The process flow 900 of FIG. 9 may be executed by at least one processor 102 and/or by a combination of at least one processor 102, PME 122, and camera 101. In some further examples, the process flow 900 may be executed at least in part by one or more remote computing devices such as remote computing device 180 depicted in FIG. 1. The actions of process flow 900 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process flow 900 may be described with reference to elements of FIGS. 1-8.

Processing may begin at action 902, "Receive first and second YUV histograms". At action 902, the at least one processor 102 may receive a first histogram corresponding to a first frame of image data of video 106 and a second histogram corresponding to a second frame of image data of video 106.

Processing may continue from action 902 to action 904, "Determine Euclidean distance between first and second YUV histograms". At action 904, the at least one processor 102 may determine a Euclidean distance between histograms received at action 902. If, at action 906, the Euclidean distance exceeds a scene difference threshold, processing may continue from action 906 to action 908. Conversely, if, at action 906, the Euclidean distance is less than the scene difference threshold, processing may return to action 902.

At action 908, a background model of the environment (e.g., the environment depicted in scene 150 of FIG. 1) may be generated. The background model may be generated from a number of histograms corresponding to sequential frames representing the environment. A Gaussian distribution may be determined for each bin of the histograms, as described above in reference to FIG. 3.

Processing may proceed from action 908 to action 910, "Compare bins of histogram of current frame to Gaussian distributions of background model". At action 910, the at least one processor 102 may compare bin values of a histogram of a current frame of image data to the corresponding Gaussian distributions. At action 912, if greater than a threshold number of bins of the histogram of the current frame exceed a deviation band (e.g., +/−3σ), processing may proceed to action 914. Conversely, if less than the threshold number of bins of the histogram of the current frame exceed the deviation bin, processing may return to action 902.

At action 914, matching blocks between two frames of image data of video 106 may be determined using a block-matching algorithm. Processing may continue from action 914 to action 916, "Determine SAD and motion vector of each pair of matching blocks". At action 916, SAD may be determined for each pair of matching blocks based on the difference in component values of the matching blocks. Additionally, at action 910, a motion vector representing the change in location of the block in the frame between the matching frames may be determined (e.g., ($|d_x|$, $|d_y|$)).

Processing may continue from action 916 to action 918, at which a flow value is determined. At action 918, the flow value F may be determined as: $F=SAD(B_1, B_2)+a*(|d_x|+|d_y|)-b*Avg(B_1)$. $SAD(B_1, B_2)$ may represent the SAD between the first component values of the first block and the second component values of the second block. ($|d_x|+|d_y|$) may represent the motion vector. $Avg(B_1)$ may represent an average luma of the first block, a may represent a first weight value and b may represent a second weight value.

Processing may proceed from action 918 to action 920 at which a determination may be made whether the flow value F exceeds a threshold flow value. If the flow value F determined at action 918 exceeds the threshold flow value, processing may continue from action 920 to action 922. At action 922, streaming of a portion of video 106 is initiated. In various examples, the streaming may comprise encoding and streaming a number of frames prior to the frames used to determine the flow F in order to capture potential motion of interest occurring prior to the initiation of streaming. Conversely, if the flow value F does not exceed the threshold flow value, processing may return to action 902.

Among other potential benefits, a system in accordance with the present disclosure may limit and/or reduce video encoded and streamed over the network for further processing to those portions of image data which include significant scene changes and motion. Small scale motion and changing lighting conditions may avoid triggering streaming of video from system 100 to one or more remote computing devices 180. Advantageously, limiting the streaming of video to those frames of image data including significant motion and/or scene changes can conserve network bandwidth and reduce the load on remote cloud processing resources. Accordingly, the various techniques described herein may be used to discriminate between motion that is of significant interest to users and small, insignificant motions caused by, for example, wind, changing lighting conditions, vibrations, etc.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   determining a Euclidean distance between a first histogram of a first frame of video data representing an environment and a second histogram of a second frame of the video data;
   determining that the Euclidean distance exceeds a threshold value;
   determining, in response to the Euclidean distance exceeding the threshold value, a flow value representing changes in the environment represented in a third frame of the video data and a fourth frame of the video data, wherein the flow value is determined based at least in part on a motion vector between a first block of pixels of the third frame of the video data and a second block of pixels of the fourth frame of the video data, and a sum of absolute differences (SAD) between the first block of pixels and the second block of pixels;
   determining that the flow value exceeds a flow threshold value; and
   transmitting to a remote computing device at least a first portion of the video data subsequent to the first frame based at least in part on the flow value exceeding the flow threshold value.

2. The method of claim 1, further comprising:
   receiving a plurality of other histograms, wherein each of the plurality of other histograms is associated with a respective one of a plurality of sequential frames of the video data following the first frame and the second frame, and wherein each of the plurality of other histograms has a plurality of bins with each of the plurality of bins comprising a first bin value; and
   generating a model of the environment, wherein the model comprises a plurality of distributions, wherein each of the plurality of distributions is associated with a corresponding one of the plurality of bins, wherein each distribution has a corresponding standard deviation band of $+/-3\sigma$.

3. The method of claim 2, further comprising:
   receiving a third histogram of a fifth frame of the video data, wherein the third histogram comprises a plurality of histogram values; and
   for each of a first number of bins of the third histogram, determining that a corresponding first bin value of the first number of bins lies outside a standard deviation band of the model of the environment.

4. The method of claim 1, further comprising determining an average luma value of each block of pixels of the third frame, wherein the determining the flow value is further based at least in part on the average luma value of the first block of pixels.

5. The method of claim 1, further comprising:
   determining a second flow value representing changes in the environment represented in a fifth frame of the video data and a sixth frame of the video data, wherein the second flow value is determined based at least in part on a second motion vector between a third block of pixels of the fifth frame of the video data and a fourth block of pixels of the sixth frame of the video data, and a second sum of absolute differences (SAD) between the third block of pixels and the fourth block of pixels;

determining that the second flow value exceeds the flow threshold value; and sending a second number of frames of the video data to the remote computing device, wherein the second number of frames represents a second portion of the video that is consecutive to the first portion of the video.

6. The method of claim 1, further comprising:
storing the flow value in a memory;
receiving an indication of an exposure change of a camera device capturing the video data; and
resetting the flow value stored in the memory to an initial value.

7. The method of claim 1, wherein the flow value is stored in a memory, the method further comprising:
resetting the flow value to an initial value;
determining a second flow value representing changes in the environment represented in a fifth frame of the video data and a sixth frame of the video data;
determining, after a first period of time, that the second flow value does not exceed the flow threshold value;
determining a second Euclidean distance between a third histogram of a seventh frame and of the video data and a fourth histogram of an eighth frame of the video data;
determining that the second Euclidean distance does not exceed the threshold value; and
ceasing streaming of the video data following the first portion of the video data.

8. The method of claim 1, further comprising:
receiving, from a camera device, an indication that infrared lighting conditions of the environment have changed from a first level to a second level;
receiving a fifth frame of the video data, wherein the fifth frame of the video data is captured by the camera device within a first amount of time after receiving the indication;
determining that the fifth frame comprises unstable lighting conditions based on the first amount of time being less than a threshold amount of time; and
ceasing to transmit at least a second portion of the video data to the remote computing device.

9. A computing device comprising:
a camera device;
at least one processor configured in communication with the camera device; and
a non-transitory, computer-readable memory configured in communication with the at least one processor, the memory storing instructions that, when executed by the at least one processor, are effective to cause the at least one processor to perform a method comprising:
determining a Euclidean distance between a first histogram of a first frame of video data representing an environment and a second histogram of a second frame of the video data;
determining that the Euclidean distance exceeds a threshold value;
determining, in response to the Euclidean distance exceeding the threshold value, a flow value representing changes in the environment represented in a third frame of the video data and a fourth frame of the video data, wherein the flow value is determined based at least in part on a motion vector between a first block of pixels of the third frame of the video data and a second block of pixels of the fourth frame of the video data, and a sum of absolute differences (SAD) between the first block of pixels and the second block of pixels;

determining that the flow value exceeds a flow threshold value; and transmitting to a remote computing device at least a first portion of the video data subsequent to the first frame based at least in part on the flow value exceeding the flow threshold value.

10. The computing device of claim 9, wherein the instructions, when executed by the at least one processor, are effective to perform the method, further comprising:
receiving a plurality of other histograms, wherein each of the plurality of other histograms is associated with a respective one of a plurality of sequential frames of the video data following the first frame and the second frame, and wherein each of the plurality of other histograms has a plurality of bins with each of the plurality of bins comprising a first bin value; and
generating a model of the environment, wherein the model comprises a plurality of distributions, wherein each of the plurality of distributions is associated with a corresponding one of the plurality of bins, wherein each distribution has a corresponding standard deviation band of $+/-3\sigma$.

11. The computing device of claim 10, wherein the instructions, when executed by the at least one processor, are effective to perform the method, further comprising:
receiving a third histogram of a fifth frame of the video data, wherein the third histogram comprises a plurality of histogram values; and
for each of a first number of bins of the third histogram, determining that a corresponding first bin value of the first number of bins lies outside a standard deviation band of the model of the environment.

12. The computing device of claim 9, wherein the instructions, when executed by the at least one processor, are effective to perform the method, further comprising:
determining an average luma value of each block of pixels of the third frame, wherein the determining the flow value is further based at least in part on the average luma value of the first block of pixels.

13. The computing device of claim 9, wherein the instructions, when executed by the at least one processor, are effective to perform the method, further comprising:
determining a second flow value representing changes in the environment represented in a fifth frame of the video data and a sixth frame of the video data, wherein the second flow value is determined based at least in part on a second motion vector between a third block of pixels of the fifth frame of the video data and a fourth block of pixels of the sixth frame of the video data, and a second sum of absolute differences (SAD) between the third block of pixels and the fourth block of pixels;
determining that the second flow value exceeds the flow threshold value; and
sending a second number of frames of the video data to the remote computing device, wherein the second number of frames represents a second portion of the video data that is consecutive to the first portion of the video data.

14. The computing device of claim 9, wherein the instructions, when executed by the at least one processor, are effective to perform the method, further comprising:
storing the flow value in the memory;

receiving an indication of an exposure change of the camera device; and resetting the flow value stored in the memory to an initial value.

15. The computing device of claim 9, wherein the instructions, when executed by the at least one processor, are effective to perform the method, further comprising:

resetting the flow value to an initial value;

determining a second flow value representing changes in the environment represented in a fifth frame of the video data and a sixth frame of the video data;

determining, after a first period of time, that the second flow value does not exceed the flow threshold value;

determining a second Euclidean distance between a third histogram of a seventh frame and of the video data and a fourth histogram of an eighth frame of the video data;

determining that the second Euclidean distance does not exceed the threshold value; and ceasing streaming of the video data following the first portion of the video data.

16. The computing device of claim 9, wherein the flow value is stored in the memory, and the instructions, when executed by the at least one processor, are effective to perform the method, further comprising:

receiving, from the camera device, an indication that infrared lighting conditions of the environment have changed from a first level to a second level;

receiving a fifth frame of the video data, wherein the fifth frame of the video data is captured by the camera device within a first amount of time after receiving the indication;

determining that the fifth frame comprises unstable lighting conditions based on the first amount of time being less than a threshold amount of time; and ceasing to transmit at least a second portion of the video data to the remote computing device.

17. A method comprising:

determining a Euclidean distance between a first histogram of a first frame of video data representing an environment and a second histogram of a second frame of the video data;

determining that the Euclidean distance exceeds a threshold value;

determining a first flow value representing changes in the environment represented in a third frame of the video data and a fourth frame of the video data, wherein the first flow value is determined based at least in part on a first motion vector between a first block of pixels of the third frame of the video data and a second block of pixels of the fourth frame of the video data, and a first sum of absolute differences (SAD) between the first block of pixels and the second block of pixels;

determining that the first flow value exceeds a flow threshold value;

sending a first number of frames of the video data representing a first portion of the video data to a remote computing device;

determining a second flow value representing changes in the environment represented in a fifth frame of the video data and a sixth frame of the video data, wherein the second flow value is determined based at least in part on a second motion vector between a third block of pixels of the fifth frame of the video data and a fourth block of pixels of the sixth frame of the video data, and a second sum of absolute differences (SAD) between the third block of pixels and the fourth block of pixels;

determining that the second flow value exceeds the flow threshold value; and sending a second number of frames of the video data to the remote computing device, wherein the second number of frames represents a second portion of the video that is consecutive to the first portion of the video data.

18. The method of claim 17, further comprising:

receiving a plurality of other histograms, wherein each of the plurality of other histograms is associated with a respective one of a plurality of sequential frames of the video data following the first frame and the second frame, and wherein each of the plurality of other histograms has a plurality of bins with each of the plurality of bins comprising a first bin value; and generating a model of the environment, wherein the model comprises a plurality of distributions, wherein each of the plurality of distributions is associated with a corresponding one of the plurality of bins, wherein each distribution has a corresponding standard deviation band of $+/-3\sigma$.

19. The method of claim 18, further comprising:

receiving a third histogram of a fifth frame of the video data, wherein the third histogram comprises a plurality of histogram values; and for each of a first number of bins of the third histogram, determining that a corresponding first bin value of the first number of bins lies outside a standard deviation band of the model of the environment.

20. The method of claim 17, further comprising determining an average luma value of each block of pixels of the third frame, wherein the determining the flow value is further based at least in part on the average luma value of the first block of pixels.

* * * * *